(12) United States Patent
Singh et al.

(10) Patent No.: US 9,866,597 B2
(45) Date of Patent: *Jan. 9, 2018

(54) AMBIENT COMMUNICATION SESSION (71) Applicant: Google Inc., Mountain View, CA (US)

(72) Inventors: Ujjwal Singh, Palo Alto, CA (US); Nikhyl P. Singhal, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/809,557

(22) Filed: Jul. 27, 2015

(65) Prior Publication Data
US 2015/0334140 A1 Nov. 19, 2015

Related U.S. Application Data (63) Continuation of application No. 13/526,340, filed on Jun. 18, 2012, now Pat. No. 9,094,476.

(Continued)

(51) Int. Cl.
*G06F 15/16* (2006.01)
*H04L 29/06* (2006.01)
(Continued)

(52) U.S. Cl.
CPC .......... *H04L 65/1069* (2013.01); *G06F 3/00* (2013.01); *G06F 3/0481* (2013.01);
(Continued)

(58) Field of Classification Search
CPC ............. H04L 65/1069; H04L 12/1813; H04L 12/1827; H04L 65/403
(Continued)

(56) References Cited

U.S. PATENT DOCUMENTS 5,375,068 A 12/1994 Palmer et al.
5,793,365 A 8/1998 Tang et al.
(Continued)

OTHER PUBLICATIONS

"Ruby on rails—Implementing an Online Waiting Room," [online]. First Accessed on Oct. 7, 2011. Retrieved from the Internet: http://stackoverflow.com/questions/2669891/implementing-an-on-line-waiting-- room, 2 pg.
(Continued)

*Primary Examiner* — Philip B Tran
(74) *Attorney, Agent, or Firm* — RMCK Law Group, PLC (57) ABSTRACT

In general, this disclosure describes techniques for initiating a communication session when a user indicates she or he is available to participate in the communication session. In one example, a method includes receiving, by a first communication device, an indication that a user is available to participate in a communication session that enables communication between different communication devices. Responsive to receiving the at least one signal, the communication session may be initiated in an inactive mode at the first communication device. The first communication device may receive a request from a second communication device to participate in the communication session. Responsive to receiving the request, the communication session may be switched from the inactive mode to an active mode.

21 Claims, 5 Drawing Sheets

Related U.S. Application Data (60) Provisional application No. 61/497,923, filed on Jun. 16, 2011.

(51) Int. Cl.

| | | |
|---|---|---|
| *G06F 3/00* | (2006.01) | |
| *H04L 12/18* | (2006.01) | |
| *H04N 7/14* | (2006.01) | |
| *H04N 7/15* | (2006.01) | |
| *H04N 21/414* | (2011.01) | |
| *H04N 21/4788* | (2011.01) | |
| *G06F 3/0482* | (2013.01) | |
| *G06F 3/0484* | (2013.01) | |
| *G06F 3/0481* | (2013.01) | |
| *G06Q 10/10* | (2012.01) | |
| *G06Q 50/00* | (2012.01) | |

(52) U.S. Cl.
CPC ........ *G06F 3/0482* (2013.01); *G06F 3/04842* (2013.01); *G06Q 10/10* (2013.01); *H04L 12/1813* (2013.01); *H04L 12/1827* (2013.01); *H04L 65/403* (2013.01); *H04N 7/147* (2013.01); *H04N 7/15* (2013.01); *H04N 21/41407* (2013.01); *H04N 21/4788* (2013.01); *G06Q 50/01* (2013.01)

(58) Field of Classification Search
USPC .................................................. 709/203–205
See application file for complete search history.

(56) References Cited

U.S. PATENT DOCUMENTS

| | | | |
|---|---|---|---|
| 5,880,731 A | 3/1999 | Liles et al. | |
| 6,434,599 B1 | 8/2002 | Porter | |
| 7,016,935 B2 | 3/2006 | Lee et al. | |
| 7,620,902 B2 | 11/2009 | Manion et al. | |
| 7,752,553 B2 | 7/2010 | Pennington et al. | |
| 7,822,809 B2 | 10/2010 | Dhupelia et al. | |
| 7,865,566 B2 | 1/2011 | Ashtekar et al. | |
| 7,945,862 B2 | 5/2011 | Aldrich et al. | |
| 7,983,927 B2 | 7/2011 | McGill et al. | |
| 7,984,098 B2 | 7/2011 | Enete et al. | |
| 8,032,470 B1 | 10/2011 | Heidenreich et al. | |
| 8,443,041 B1 | 5/2013 | Krantz et al. | |
| 8,538,895 B2 | 9/2013 | Appelman et al. | |
| 8,560,606 B2 | 10/2013 | Chakra et al. | |
| 8,661,076 B2 | 2/2014 | Herman | |
| 8,693,653 B1 | 4/2014 | Mullen | |
| 8,700,714 B1 | 4/2014 | Pan et al. | |
| 8,843,834 B2 | 9/2014 | Wood et al. | |
| 9,094,476 B1 * | 7/2015 | Singh | G06F 3/00 |
| 2001/0048449 A1 | 12/2001 | Baker | |
| 2002/0078150 A1 | 6/2002 | Thompson et al. | |
| 2002/0130904 A1 | 9/2002 | Becker et al. | |
| 2003/0041326 A1 | 2/2003 | Novak et al. | |
| 2003/0074451 A1 | 4/2003 | Parker et al. | |
| 2004/0186887 A1 | 9/2004 | Galli et al. | |
| 2004/0218035 A1 | 11/2004 | Crook | |
| 2004/0249811 A1 | 12/2004 | Shostack et al. | |
| 2004/0260781 A1 | 12/2004 | Shostack et al. | |
| 2004/0267938 A1 | 12/2004 | Shoroff et al. | |
| 2005/0267766 A1 | 12/2005 | Galbreath et al. | |
| 2005/0273503 A1 | 12/2005 | Carr et al. | |
| 2006/0031772 A1 | 2/2006 | Valeski | |
| 2006/0098085 A1 | 5/2006 | Nichols et al. | |
| 2006/0176831 A1 | 8/2006 | Greenberg et al. | |
| 2006/0182249 A1 | 8/2006 | Archambault et al. | |
| 2006/0287106 A1 | 12/2006 | Jensen | |
| 2007/0020603 A1 | 1/2007 | Woulfe | |
| 2007/0050452 A1 | 3/2007 | Raju | |
| 2007/0071209 A1 | 3/2007 | Horvitz et al. | |
| 2007/0169165 A1 | 7/2007 | Crull et al. | |
| 2007/0208806 A1 | 9/2007 | Mordecai et al. | |
| 2007/0211141 A1 | 9/2007 | Christiansen | |
| 2007/0233291 A1 | 10/2007 | Herde et al. | |
| 2007/0299912 A1 | 12/2007 | Sharma et al. | |
| 2008/0070697 A1 | 3/2008 | Robinson et al. | |
| 2008/0140523 A1 | 6/2008 | Mahoney et al. | |
| 2008/0192732 A1 | 8/2008 | Riley et al. | |
| 2008/0201638 A1 | 8/2008 | Nair | |
| 2008/0209339 A1 | 8/2008 | Macadaan et al. | |
| 2008/0209351 A1 | 8/2008 | Macadaan et al. | |
| 2008/0222533 A1 | 9/2008 | Hankejh et al. | |
| 2008/0229215 A1 | 9/2008 | Baron et al. | |
| 2008/0256182 A1 | 10/2008 | Sekaran et al. | |
| 2008/0260138 A1 | 10/2008 | Chen et al. | |
| 2008/0273079 A1 | 11/2008 | Campbell et al. | |
| 2009/0040289 A1 | 2/2009 | Hetherington et al. | |
| 2009/0063995 A1 | 3/2009 | Baron et al. | |
| 2009/0086957 A1 | 4/2009 | Kelley et al. | |
| 2009/0217165 A1 | 8/2009 | Ito et al. | |
| 2009/0222742 A1 | 9/2009 | Pelton et al. | |
| 2009/0235183 A1 | 9/2009 | Hamilton et al. | |
| 2010/0057857 A1 | 3/2010 | Szeto | |
| 2010/0082693 A1 | 4/2010 | Hugg et al. | |
| 2010/0174783 A1 | 7/2010 | Zarom | |
| 2010/0192072 A1 | 7/2010 | Spataro et al. | |
| 2010/0203968 A1 | 8/2010 | Gill et al. | |
| 2010/0205541 A1 | 8/2010 | Rapaport et al. | |
| 2010/0221693 A1 | 9/2010 | Gupta | |
| 2010/0226288 A1 | 9/2010 | Scott et al. | |
| 2010/0241580 A1 | 9/2010 | Schleier-Smith | |
| 2010/0246448 A1 | 9/2010 | Krantz et al. | |
| 2010/0251124 A1 | 9/2010 | Geppert et al. | |
| 2010/0257577 A1 | 10/2010 | Grandison et al. | |
| 2011/0055309 A1 | 3/2011 | Gibor et al. | |
| 2011/0092282 A1 | 4/2011 | Gary | |
| 2011/0106662 A1 | 5/2011 | Stinchcomb | |
| 2011/0107239 A1 | 5/2011 | Adoni et al. | |
| 2011/0126132 A1 | 5/2011 | Anderson et al. | |
| 2011/0154223 A1 | 6/2011 | Whitnah et al. | |
| 2011/0161987 A1 | 6/2011 | Huang et al. | |
| 2011/0185025 A1 | 7/2011 | Cherukuri et al. | |
| 2011/0185057 A1 | 7/2011 | Waugaman et al. | |
| 2011/0222466 A1 | 9/2011 | Pance et al. | |
| 2011/0231396 A1 | 9/2011 | Dhara et al. | |
| 2011/0269540 A1 | 11/2011 | Gillo et al. | |
| 2011/0271205 A1 | 11/2011 | Jones et al. | |
| 2011/0283203 A1 | 11/2011 | Periyannan et al. | |
| 2011/0300841 A1 | 12/2011 | Archambault et al. | |
| 2011/0319175 A1 | 12/2011 | Jensen | |
| 2011/0320373 A1 | 12/2011 | Lee et al. | |
| 2012/0092438 A1 | 4/2012 | Guzman Suarez et al. | |
| 2012/0124176 A1 | 5/2012 | Curtis et al. | |
| 2012/0150953 A1 | 6/2012 | Costanzo et al. | |
| 2012/0154510 A1 | 6/2012 | Huitema et al. | |
| 2012/0216129 A1 | 8/2012 | Ng et al. | |
| 2012/0246229 A1 | 9/2012 | Carr et al. | |

OTHER PUBLICATIONS

"TJN Chat Room—The Jazz Newwork Worldwide," [online]. First Accessed Dec. 5, 2011 Retrieved from the Internet: http://www.thejazznetworkworldwide.com/group/tjnchatroom, 17 pgs.

Apple, Inc. Using your built-in iSight camera. Nov. 14, 2011 accessed on Aug. 5, 2013 from Internet http;//support.apple.com/kb/ht1462. p. 1-2.

Avchat Video Chat "AVChat Video Chat Features, Tons of Features, Insanely Flexible," [online]. First Accessed Aug. 18, 2011. Retrieved from the Internet: http://avchal.nel/features.php, 4 pgs.

Blizzard Entertainment, "World of Warcraft", 2004, 114 pages.

Chat excerpt from http://www.apple.com/macosx/apps/all.html#chat, downloaded Jul. 11, 2011, 1 p.

MMO-Champion, "Post your character selection screen!", Oct. 27, 2009, retrieved on Feb. 18, 2015, retrieved from <http://www.mmo-champion.com/threads/675832-Post-you-character-selection-screen>, pp. 1-9.

NNRD435158. "Automatically Moderated Group Debate on the Internet." IBM Technical Disclosure Bulletin. Jul. 2000, UK. Issue 435, p. 1299.

(56) References Cited

OTHER PUBLICATIONS

Parkes, "Skype for iPhone will run in the background with iPhone OS 4", Apr. 8, 2010, The Big Blog [online]. Retrieved from the Internet: <http://blogs.skype.com/en/2010/04/skype.sub.-for.sub.-iphone.sub.-will.sub.--run.sub.--in.sub.--t.html> (10 pgs.).
Roseman et al., TeamRooms: Network Places for Collaboration. 1996. ACM, Computer Supported Cooperative Work 96. p. 325-33.
Weisz et al., "Watching Together: Integrating Text Chat With Video," CHI 2007 Proceedings—Video, Apr. 28-May 3, 2007, San Jose, CA, pp. 877-886.
Wikipedia page: Skype.TM., last modified Jul. 10, 2011, 22 pp.
Wikipedia page: Tinychat, last modified Jun. 15, 2011, 2 pp.
www.tinychat.com, "Video chat with friends & meet new ones from all around the world—today," downloaded Jul. 11, 2011, 18 pp.

* cited by examiner

AMBIENT COMMUNICATION SESSION

CLAIM OF PRIORITY

This application is a continuation of U.S. patent application Ser. No. 13/526,340, filed Jun. 18, 2012, which claims the benefit of priority to U.S. Provisional Application No. 61/497,923, filed Jun. 16, 2011, both of which are assigned to the assignee hereof and are hereby expressly incorporated by reference herein in their entirety.

BACKGROUND

A user may socialize with her or his contacts by chatting, watching television or videos, playing games, or engaging in other activities with the contacts. In some instances, a user and his or her contacts may not be in the same physical location. Instead, the user and the contacts may rely on other mechanisms to socialize, such as talking on the phone, sending email, or text messaging.

SUMMARY

In one example a method is provided, the method comprising receiving, at a first communication device, at least one signal indicating that is available to participate in a communication session that enables communication between different communication devices. The method further comprises responsive to receiving the at least one signal, initiating the communication session in an inactive mode of operation at the first communication device. The method also comprises receiving, at the first communication device, a request from a second communication device to participate in the communication session and responsive to receiving the request, switching the communication session at the first communication device from the inactive mode of operation to an active mode of operation.

In another example, another method is provided that comprises receiving, from a first communication device, at least one signal indicating that a user is available to participate in a communication session, wherein the communication session enables communication between different communication devices. The method also comprises responsive to receiving the at least one signal, providing a notification to one or more other communication devices associated with the first communication device, wherein the notification indicates that the first computing device is available to participate in the communication session. The method further comprises initiating the communication session in an inactive mode, wherein no communication devices are participating the communication session while in the inactive mode. The method further comprises receiving, from a second communication device of the one or more other communication devices, a request to join the communication session and responsive to receiving the request, switching the communication session into an active mode of operation. The method also comprises joining the first communication device and the second communication device to the communication session in the active mode of operation.

In yet another example, a computer-readable storage medium is provided. The computer-readable storage medium comprising instructions for causing a programmable processor to perform operations comprising receive, at a first communication device, at least one signal indicating that a user is available to participate in a communication session that enables communication between different communication devices. The instructions further comprise responsive to receiving the at least one signal, initiate the communication session in an inactive mode at the first communication device. The instructions also comprise receive, at the first communication device, a request from a second communication device to participate in the communication session and responsive to receiving the request, switch the communication session at the first communication device from the inactive mode to an active mode.

In another example, a computing device is provided, comprising a network interface to connect to a real-time communication session having a plurality of participants. The computing device also comprises an output device that displays image data. The computing device further comprises one or more processors configured to receive at least one signal indicating that a user is available to participate in a communication session that enables communication between different computing devices, responsive to receiving the at least one signal, initiate the communication session in an inactive mode, receive a request from a second computing device to participate in the communication session, responsive to receiving the request, launch the communication session, and invite the second computing device to join the communication session.

BRIEF DESCRIPTION OF DRAWINGS

In accordance with common practice, the various described features are not drawn to scale and are drawn to emphasize features relevant to the present application. Like reference characters denote like elements throughout the figures and text.

DETAILED DESCRIPTION

Friends, family members, colleagues, or other individuals who wish to socialize or otherwise communicate may not always be in the same physical location at the time they would like to communicate. Some individuals may rely upon telephonic, text, or other forms of communication that support limited forms of socializing. For example, conventional forms of communication may support multi-way audio and/or video communication. However, some forms of communication are not sufficient to be able to provide the individuals an experience similar to actually socializing in person. Talking with someone over the phone or texting may not create a shared experience similar to sitting a room together watching a movie or playing a game.

Techniques of this disclosure may, in various instances, provide a mechanism for two or more individuals to socialize in the same virtual location (e.g., a virtual communication session). A virtual communication session may be a virtual space where multiple users can engage in a conversation and/or share information. For example, individuals participating in the virtual communication session may share and watch videos, play games, participate in video, audio, or text chat, surf the web, or any combination thereof. In other words, techniques of this disclosure may enable the creation of a virtual communication session that may approximately mirror the experience of individuals hanging out in the same physical location.

When a user is available for a conversation (e.g., hanging out), the user may select an option in an application (e.g., a social media application) executed by a computing device that indicates that the user is available. An invitation or notification may be sent to people associated with the user (e.g., the user's contacts or friends) indicating that the user is available to chat. Users may be associated with each other through a contacts list, social media, history of being in a previous communication session together, or other means. The invitation may be provided in a social media feed. When a second user decides to converse, interact, or socialize in a virtual space with the first user, a communication session may be initiated between the first and second users.

Some of the techniques described herein are directed to joining and initiating virtual communication sessions in a social network. A user may provide an indication that he or she is available to participate in a communication session. Based on this indication, a communication session may be partially initiated or initiated in an inactive mode or state. A communication session is in an inactive mode in the sense that while the user may indicate she or he is available for a communication session, no one is currently participating in the communication session. The communication session may not be fully launched. During an inactive mode, an application for the communication session may be running in the background of a computing device that will be used to engage in the communication session. An inactive communication session may be referred to as an ambient communication session. A notification or invitation (e.g., via a feed in a social media) may be provided to a group of people associated with the user (e.g., the user's friends). In some examples, the communication session is not fully launched until another participant seeks to join the user's inactive communication session.

Figure 1:
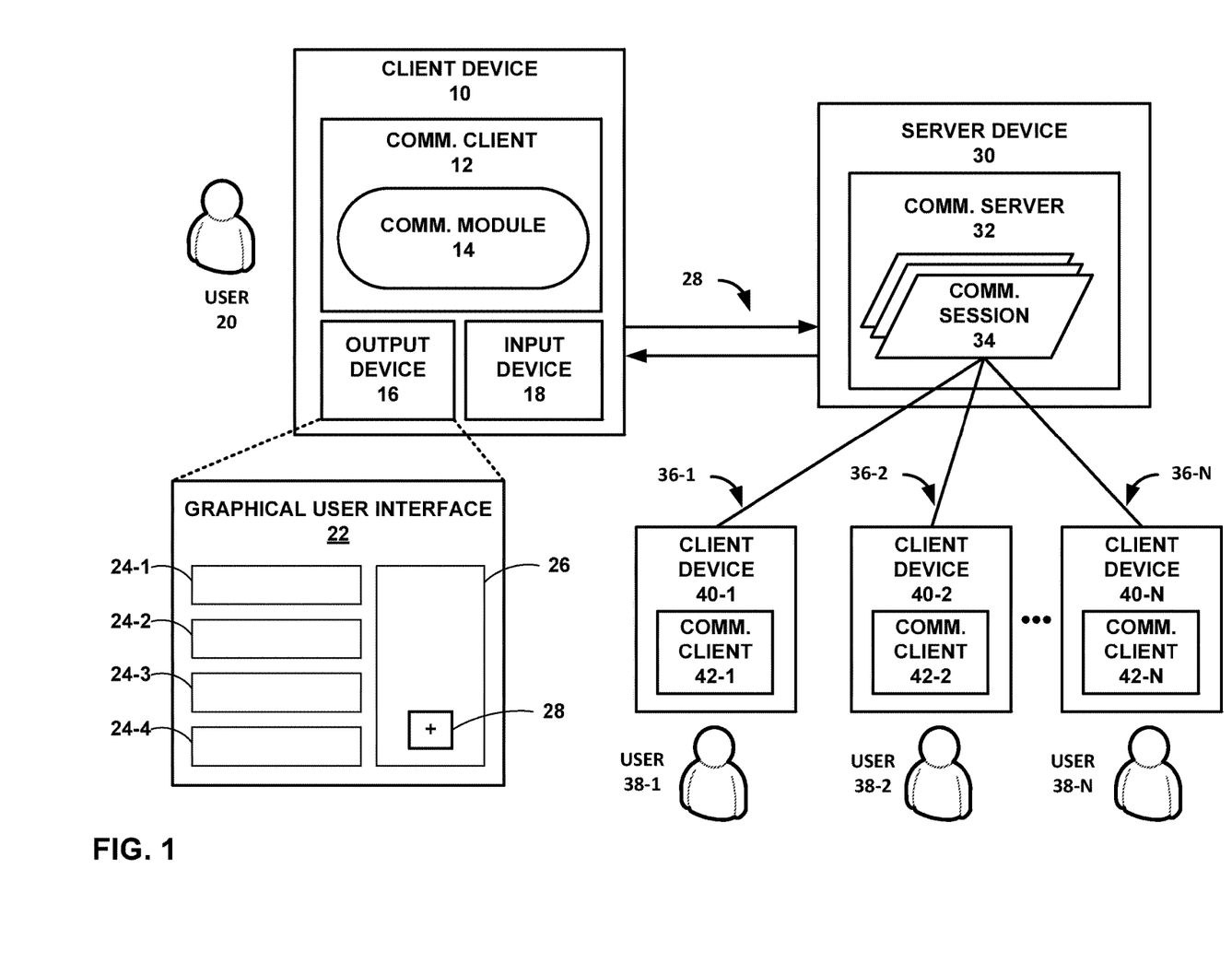
FIG. 1 is a block diagram illustrating an example of one or more client devices engaged in a communication session that enables communication between the client devices, in accordance with one or more aspects of the present disclosure.

FIG. 1 is a block diagram illustrating an example of one or more client devices 10 and 40-1 through 40-N engaged in a communication session that enables communication between the client devices 10 and 40-1 through 40-N, in accordance with one or more aspects of the present disclosure. Examples of client devices 10 and 40-1 through 40-N (referred to collectively as "client devices 40"), may include, but are not limited to, portable or mobile devices such as mobile phones (including smart phones), laptop computers, personal digital assistants (PDAs), portable gaming devices, portable media players, and e-book readers. In some examples, client devices 10 and 40 are computing devices. Client devices 10 and each of client devices 40 may be the same or different types of devices. For example, client device 10 and client device 40-1 may both be mobile phones. In another example, client device 10 may be a mobile phone and client device 40-1 may be a desktop computer. FIG. 1 illustrates an example with three client devices 40. However, other numbers of client devices 40 may be present in other examples.

As illustrated in FIG. 1, client device 10 may communicate with a server device 30 via at least one communication channel 28. Server device 30 may include a communication server 32 that maintains one or more communication sessions, such as communication session 34. Various components described in FIG. 1 may include similar properties and characteristics as described throughout this disclosure.

Client device 10 of FIG. 1 may include a communication client 12, at least one output device 16, and at least one input device 18. Communication client 12 may further include a communication module 14 that enables communication client 12 to connect to communication server 32 and join one or more communication sessions, such as communication session 34. Communication module 14 may further include functionality that causes output device 16 to display a graphical user interface (GUI) 22 that may be related to communication session 34. Two or more client devices 10, 40 may join the same communication session to enable communication between the client devices 10, 40 and create a virtual communication session. For example, client device 10 and client device 40-1 may join communication session 34 to enable communications between client device 10 and client device 40-1, which may be through a virtual communication session.

Communication client 12 and communication server 32 may exchange audio, video, text, or other information. The information exchanged between communication client 12 and communication server 32 may depend, at least in part, on the hardware or software capabilities of client device 10. For example, if client device 10 is a mobile device with relatively lower bandwidth and computing resource capabilities, communication server 32 may select the number and quality of the audio and/or video streams sent to client device 10 based on the lower bandwidth and computing resource capabilities of client device 10. Furthermore, communication client 12 may dynamically adjust the bit rate required to send the information to communication server 32 by, for example, reducing the quality of at least one of the audio and video being sent to communication server 32.

A communication session as used herein is a broad term encompassing as its plain and ordinary meaning, including but not limited to, one or more objects, which may be at least stored in or executable by hardware, which may enable communication clients coupled to the one or more objects to exchange information. The one or more objects may include data and/or provide functionality of a communication session as described herein. For example, communication session 34 enables communication client 12 of client device 10 to communicate with a communication client 42-1 of client device 40-1.

GUI 22 is one example of a graphical user interface from which a virtual communication session may be initiated or participated in. GUI 22 may include a stream of information organized as posts, such as posts 24-1 through 24-4 (collectively, "posts 24") and a sidebar 26. Posts 24 and sidebar 26 may contain personalized information about users, such as each user invited to or participating in communication session 34. Posts 24 may include, for example, one or more of textual, image, audio, haptic, or video information associated with a particular user (e.g., user 20). Collectively, posts 24 may be referred to as a "personal loop" or "personal stream" of information associated with user 20. Each of posts 24 may be a post that is generated by user 20 or another user (e.g., one of users 38-1 through 38-N). In some examples, one or more of posts 24 may be dynamically generated or modified by communication client 12 in response to an event, such as user 20 creating or joining a virtual communication session. Posts 24 that are generated or modified in response to user 20 creating or joining a virtual communication session, such as communication session 34, may include information about the communication session. Some examples of information about the communication session that may be included in a post 24 includes a link for another user to interact with to join the virtual communication session, information about the users currently in the communication session, or information about the subject matter being discussed in the virtual communication session.

Sidebar 26 may include information about one or more other users that are "connected" to user 20, communication sessions that user 20 may join, notifications of events or invitations, or other information that may be relevant to user 20. A user, such as user 38-1, may be "connected" to user 20 through client devices 40-1 and 10 following a request-approve process. For example, client device 10 may send a request to client device 40-1 requesting to connect to client device 40-1. Client device 40-1 may provide an indication of the request to user 38-1, who may choose to accept or deny the request. Upon accepting the request, user 20 and user 38-1 may be connected to each other through communication session 34 using client devices 10 and 40-1, respectively. In some instances, user 38-1 may optionally grant permission to user 20 to view personal information entered by user 38-1, posts created by user 38-1, or other information connected to user 38-1.

User 20 may group one or more other users that are associated with user 20 through some sort of relationship into one or more groups. Groups of users associated to user 20 may be referred to as "groups" of contacts, e.g., a relationship group. Each circle may be configured to be able to view information associated with user 20. The circles may each be granted permissions related to accessing certain information associated with user 20. In some examples, different circles have different permissions. User 20 may determine a level of permission or access for each user or group associated with user 20. In some examples, a relationship group may be defined to have a level of permission, which may be applied to all users in the relationship group. A level of permission may determine whether a user has access to a subset of information about user 20 or to a different subset of posts 24 generated by user 20. If a user is included in two or more different relationship groups, user 20 may determine whether the broadest or narrowest set of permissions assigned to each relationship group are granted to the user included in the two or more different relationship groups. A relationship group may identify one or more users having at least one common characteristic with respect to a user of a communication device.

Similarly, each user, such as each user 38, may grant permission to user 20 to view or otherwise access information related to each user 38. A user, such as user 38-2, may grant user 20 permission based on a relationship group of user 38-2 that user 20 belongs to, a relationship between user 38-2 and user 20. In some examples, posts 24 may include posts by other users connected to user 20 when the other users grant permission to user 20 to view or otherwise access the respective posts.

As shown in FIG. 1, communication clients 42-1 through 42-N (referred to herein collectively as "communication clients 42") may enable users 38-1 through 38-N to join one or more communication sessions 34. Each of communication clients 42 executing on client devices 40 may include the same or similar functionality as communication client 12. As shown in FIG. 1, each of communication clients 42 may participate in communication session 34. Communication session 34 may correspond to a virtual communication session such that a virtual communication session includes the users associated with each of the communication clients connected to communication session 34. In other examples, one or more of users 38 may be connected to another communication session hosted by communication server 32. In other examples, other numbers of client devices 40 are connected to a communication session.

In order to establish or join a virtual communication session, user 20 may interact with GUI 22 to cause communication client 12 to generate a request to create a new communication session or to join an existing communication session, such as communication session 34. User 20 may create a new communication session by, for example, activating a "create communication session" button 28, which may be provided in sidebar 26. Button 28 may be a virtual button included in GUI 22, as is shown in FIG. 1, or may be a physical button on client device 10, or another device able to be toggled. Responsive to user 20 activating button 28, communication client 12 sends a request to initiate a new communication session 34 to communication server 32.

While user 20 is creating the communication session or at any time after the communication session is created, user 20 may invite additional users (e.g., one or more of users 38) to join the communication session. User 20 may select one or more different "circles" of contacts (e.g., one or more groups of users connected to user 20), one or more other users connected to user 20, or any combination thereof to which to send an invitation to join the communication session.

There may be many ways to join an existing virtual communication session. For example, to join an existing communication session, user 20 may activate a join link included in one of posts 24, select a communication session from a list of available communication sessions displayed in sidebar 26, activate a join link included in a notification displayed by GUI 22, or activate a join link displayed in some external source, such as an instant message or posting on a same or different social network. Responsive to user 20 attempting to join an existing virtual communication session, communication client 12 may send communication server 32 a request to join the virtual communication session. The request may include an identifier to a particular virtual communication session being hosted by communication server 32. The identifier may be included in a join link for the virtual communication session. Communication server 32 may connect communication client 12 to the specified communication session 34.

Thus, FIG. 1 describes an example client device 10 where an ambient communication session may be initiated but is not fully launched until another client device 40 joins the communication session. An ambient communication session may be a communication session that is inactive. An inactive communication session may be one that one or more users are not currently participating in. As used herein, an ambient communication session may be referred to interchangeably as an ambient communication session. An ambient communication session is one example of a virtual communication session. Additionally, an ambient communication session may provide only a subset of the functionality, features, or aspects of an active communication session may provide. A communication session may remain ambient as long as one or more users are not engaged in the communication session. An ambient communication session may only temporarily be ambient, because as soon as another client device 40 joins the communication session, client device 10 may activate the communication session.

User 20 may actively indicate that she or he is available to participate in a communication session when user 20 is actually available, thus reducing the possibility that user 20 is considered available when she or he may actually be unavailable. Because the communication session is prepped and at least partially initiated, when another user attempts to join the communication session, switching the communication session into an active mode may be quicker than starting a new communication session.

Figure 2:
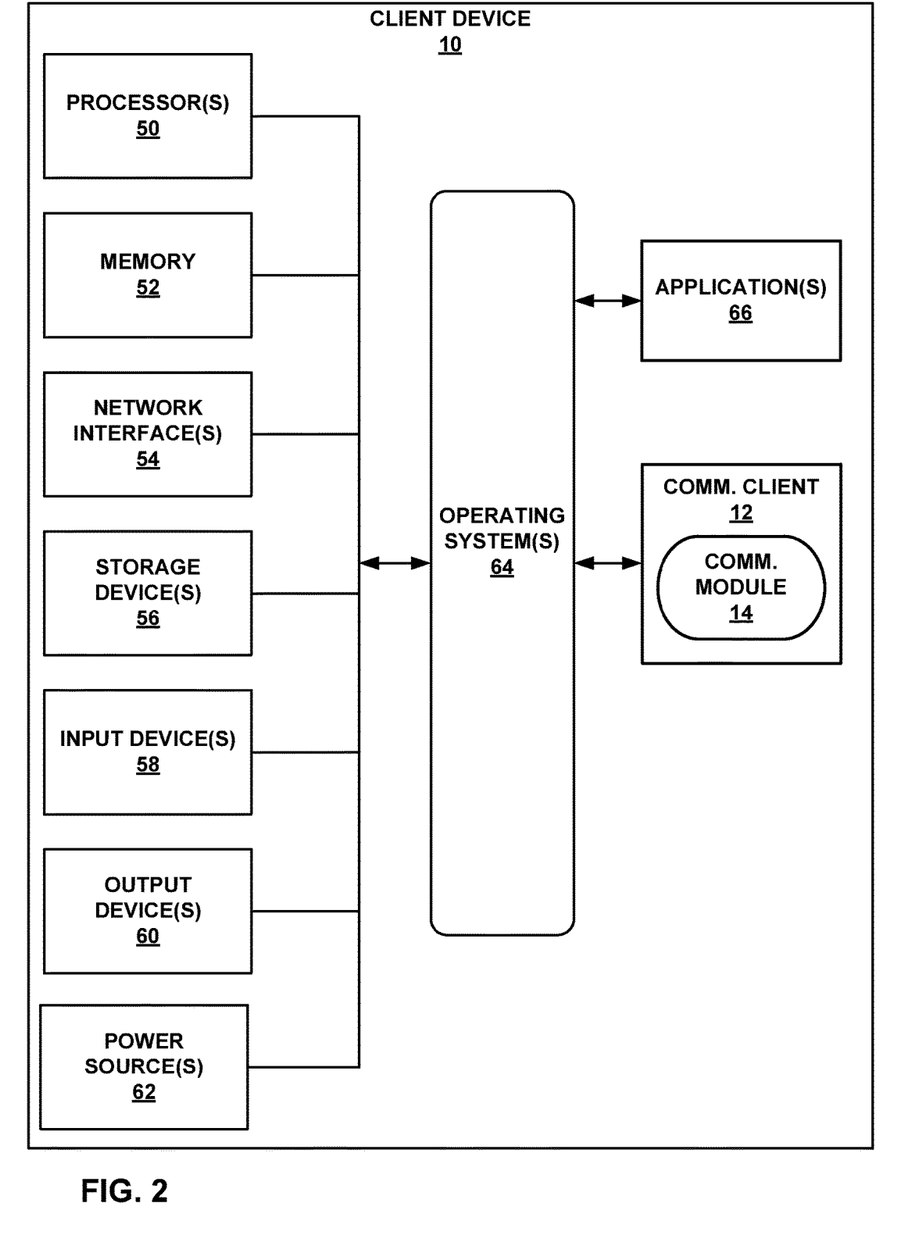
FIG. 2 is a block diagram illustrating further details of one example of a client device shown in FIG. 1, in accordance with one or more aspects of the present disclosure.

FIG. 2 is a block diagram illustrating further details of one example of client device 10 shown in FIG. 1, in accordance with one or more aspects of the present disclosure. FIG. 2 illustrates only one particular example of client device 10, and many other example embodiments of client device 10 may be used in other instances.

As shown in the specific example of FIG. 2, client device 10 includes one or more processors 50, memory 52, one or more network interfaces 54, one or more storage devices 56, one or more input devices 58, one or more output devices 60, and one or more power sources 62. Client device 10 may also include one or more operating systems 64 that are executable by client device 10. Client device 10, in one example, may further include communication client 12 and one or more applications 66 that are also executable by client device 10. Each of components 50, 52, 54, 56, 58, 60, 62, 64, 66, and 12 may be interconnected (physically, communicatively, or operatively) for inter-component communications.

Processors 50, in one example, are configured to at least implement functionality or process instructions for execution within client device 10. For example, one or more processors 50 may be capable of processing instructions stored in memory 52 or instructions stored on one or more storage devices 56.

Memory 52, in one example, is configured to store information within client device 10 during operation. Memory 52, in some examples, is described as a computer-readable storage medium. In some examples, memory 52 may be used as a temporary memory, although memory 52 may be used as long-term storage. Memory 52, in some examples, is described as a volatile memory, meaning that memory 42 does not maintain stored contents when client device 10 is powered off. Examples of volatile memories include random access memories (RAM), dynamic random access memories (DRAM), static random access memories (SRAM), and other forms of volatile memories known in the art. In some examples, memory 52 is used to store program instructions for execution by processors 50. Memory 52, in one example, is used by software or applications running on client device 10 (e.g., application 6 and/or one or more other applications 46) to temporarily store information during program execution.

Storage devices 56, in some examples, may also include one or more computer-readable storage media. Storage devices 56 may be configured to store large amounts of information. Storage devices 56 may further be configured for long-term storage of information. In some examples, storage devices 56 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Client device 10, in some examples, also includes one or more network interface 54. Client device 10, in one example, utilizes network interfaces 54 to communicate with external devices via one or more networks, such as one or more wireless networks. One or more network interfaces 54 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, client device 10 utilizes one or more network interfaces 54 to wirelessly communicate with an external device such as server device 30 of FIG. 1, a mobile phone, or other networked computing device.

Client device 10, in one example, also includes one or more input devices 58. Input devices 58, in some examples, are configured to receive input from a user through tactile, audio, or video input. Examples of input device 58 may include a presence-sensitive screen, a mouse, a keyboard, a voice responsive system, video camera, microphone or any other type of device for detecting a command from a user. In some examples, a presence-sensitive screen includes a touch-sensitive screen.

One or more output devices 60 may also be included in client device 10. Output device 60, in some examples, is configured to provide output to a user using tactile, audio, or video output. Output devices 60, in one example, may include a presence-sensitive screen or a touch screen. Output devices 60 may utilize a sound card, a video graphics adapter card, or any other type of device for converting a signal into an appropriate form understandable to humans or machines. Additional examples of output device 60 may include a speaker, a cathode ray tube (CRT) monitor, a liquid crystal display (LCD), or any other type of device that can generate intelligible output to a user.

Client device 10, in some examples, may include one or more power sources 62, which may be rechargeable and provide power to client device 10. The one or more power sources 62 may be one or more batteries. The one or more batteries may be made from nickel-cadmium, lithium-ion, or any other suitable material. In another example, the one or more power sources 62 may include a power supply connection that receives power from a power source external to client device 10. The one or more power sources 62 may provide less power to communication client 12 when the virtual communication session is in an inactive, or ambient state, than when the virtual communication session is in an active state than when it is in an inactive state.

One or more applications 66 may provide client device 10 with additional functionality. This additional functionality may include, for example, a social media application, web browsing, calendar, contacts, games, document processing, or any other functionality performed by a computing device such as client device 10. One or more applications 66 may cause at least one of output devices 16 to display some elements of a graphical user interface (GUI) 22.

Client device 10 may include one or more operating systems 64. Operating systems 64, in some examples, may control the operation of components of client device 10. For example, operating system 64, in one example, may facilitate the interaction of communication client 12 with processors 50, memory 52, network interfaces 54, storage devices 56, input devices 58, output devices 60, and power sources 62. As shown in FIG. 2, communication client 12 may include communication module 14 as described in FIG. 1. Applications 66, communication client 12, and communication module 14 may each include at least one of program instructions or data that are executable by client device 10. For example, communication module 14 may include instructions that cause communication client 12 executing on client device 10 to perform one or more of the operations and actions described in the present disclosure.

In some examples, at least one of applications 66, communication client 12, or communication module 14 may be a part of operating system 64 executing on client device 10. In some examples, communication client 12 may receive input from one or more input devices 58 of client device 10. Communication client 12 may, for example, receive at least one of audio or video information associated with a communication session (e.g., virtual communication session 34 of FIG. 1) from other computing devices participating in the communication session.

Figure 3:
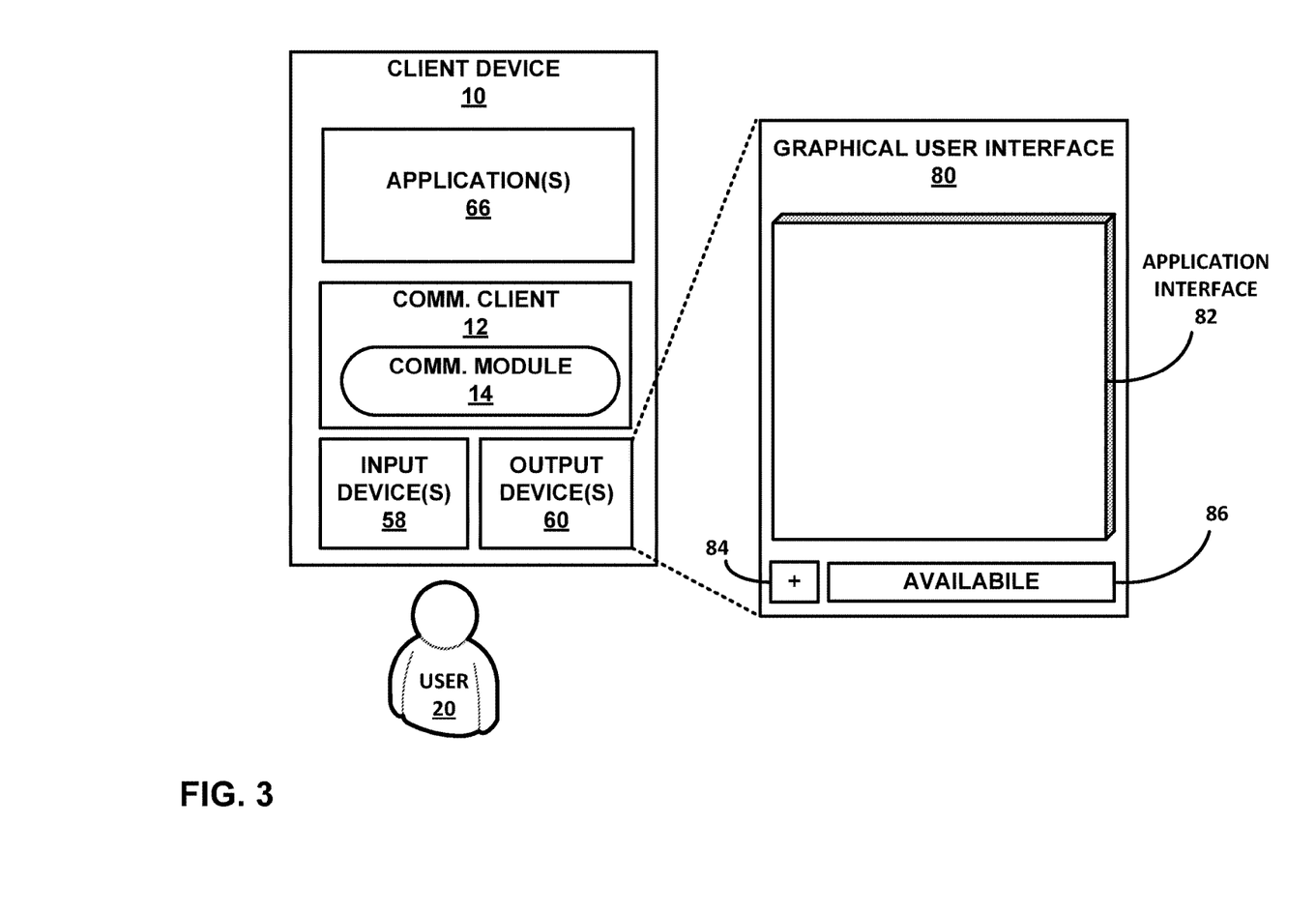
FIG. 3 is a block diagram illustrating one example of a client device configured to create an ambient communication session, in accordance with one or more aspects of the present disclosure.

FIG. 3 is a block diagram illustrating one example of a client device 10 configured to create an ambient communication session, in accordance with one or more aspects of the present disclosure. As shown in FIG. 3, the client device may be the same as or similar to client device 10 of FIGS. 1 and 2. In other examples, client device 10 may be another client device or computing device. Client device 10 is a communication device.

A user, such as user 20, may operate client device 10. Client device 10 may include one or more applications 66, communication client 12, one or more input devices 58, and one or more output devices 60. In some examples, one or more of input devices 58 and one or more of the output devices 60 may be integrated into a single input/output device, such as a presence-sense screen or a touch-sensitive screen. Client device 10 may communicate with a server device via a communication channel, such as server device 30 and communication channel 28 as shown in FIG. 1.

Communication client 12 may further include a communication module 14. Communication module 14 may provide functionality for client device 10 to engage in an interactive session (e.g., a communication session) with one or more other different client devices, such as client devices 40 of FIG. 1. Communication module 14 may further include functionality that enables communication client 12 to connect to a communication server, such as server device 30 of FIG. 1, and join one or more communication sessions.

One or more output devices 60 may provide a graphical user interface (GUI) 80. As shown in FIG. 3, GUI 80 displays application interface 82. GUI 80 may allow user 20 to use and interact with one or more applications 66 and communication client 12. Application interface 80 may allow user 20 to use and interact with communication client 12. In other examples, application interface 80 may be a graphical display that is not interactive.

Application interface 82 may be minimized when a communication session is initiated but is in inactive mode. Minimizing an application interface 82 may reduce, or not show any, displayed area of application interface 82. While the communication session is in inactive mode, another application may be in a full-screen mode on GUI 80 of client device 10. For example, an application for the communication session may be running in the background while user 20 is interacting with other applications on client device 10. That is, when running in the background, the application for the communication session may be being executed by one or more processors while a user is interacting with one or more other applications or display elements associated with the one or more other applications are outputted on a display device. When the communication session switches to active mode, for example, when another user joins the communication session, an application associated with the communication session is displayed on GUI 80.

Communication module 14 may also provide functionality for client device 10 to indicate to one or more other users that user 20 is available to engage in a communication session. A status of user 20 may be determined, for example, by client device 10 receiving user input indicating the status of user 20. In other examples, a status of user 20 may be determined based on how user 20 is interacting with client device 10, such as client device 10 being instructed to start a communication session or based on which application 66 client device 10 is executing. In some examples, the status of user 20 may be provided to one or more contacts included in a relationship group of user 20. For example, communications module 14 may notify the one or more contacts in the relationship group about the status of user 20. A relationship group may include one or more other users associated with user 20 (e.g., contacts of user 20 grouped together by user 20). Communication module 14 may also provide functionality for client device 10 to create an ambient communication session.

The communication module 14 may function as a communication session initiator that can pop up a communication session and keep it running in the background around while user 20 does other things with client device 10, such as use another application 66, functionality, or program of client device 10. Once people join the ambient communication session, the communication session may be escalated to a full in-page experience or may open up into a new window or page. In some examples, escalating the ambient communication session into a full in-page experience may interrupt what user 20 was doing with client device 10.

Because the communication session is not being used to communicate between two or more users while the communication session is ambient, an ambient communication session may be operating in the background of client device 10. By keeping the communication session ambient while no users are actively engaged with each other, client device 10 may save computing resources including power, bandwidth, processor speed, memory, and the like. However, the ambient communication session may be initialized so when another user wishes to join, the communication session can be quickly finalized, saving time. While the communication session is ambient (that is, while the communication session is inactive), user 20 may use other features or applications of client device 10, such as one or more applications 66. In one example, a communication session that is partially initiated by the communication module 14 is an ambient communication session. A partially initiated communication session may be, for example, one in which a communication session is created but no users, or only the user who caused the communication session to be created, is participating in the communication session.

Communication module 14 may also cause output device 60 to display some elements of GUI 80. For example, communication module 14 may cause GUI 80 to provide a user-selectable button 84. Button 84 may be a virtual or graphical button, such as a key of a virtual keyboard, a touch-target, etc. A touch-target may be an area of a touch-sensitive screen that corresponds to a functionality in an application, such the functionality may be interacted with when the area is depressed. In other examples, button 84 may be a physical button of client device 10, or a button on an input device 58 coupled to client device 10, such as a mouse button, a button on a mobile device, or a key of a keyboard. GUI 80 may include other graphical controls as well.

Communication module 14 may also cause output device 60 to display an availability indicator 86. Availability indicator 86 may indicate that user 20 has indicated to other users that user 20 is available to engage in a communication session. In some examples, availability indicator 86 may indicate that user 20 is not currently available for a communication session. However, in some examples, availability indicator 86 may only be present in GUI 80 when user 20 has indicated she or he is available for a communication session. In some examples, availability indicator 86 may only be displayed when the communication session is ambient, not when user 20 is engaged in the communication session.

Availability indicator 86 may be a graphical icon or shape, such as a small circle, whose visual properties are different when user 20 is available than when user 20 is unavailable. For example, availability indicator 86 may be a shape that is red when user 20 is unavailable to communication session and green when user 20 is available to communication session. In other examples, availability indicator 86 is not present, regardless of whether an ambient communication session has been initiated. A similar indication to availability indicator 86 may be outputted by other client devices, such as client devices 30, to indicate the availability of user 20.

In some examples, user 20 may be using a social media application, such as application 66, where a list of contacts of user 20 may be provided, such as in a list of icons or thumb images related to each of the contacts. Each contact of user 20, referred to herein as a friend, may be associated with an indication similar to availability indicator 86 that informs user 20 if the friend is available for a communication session or desires to participate in a communication session. If the friend is available to communication session in a communication session, the indication may reflect that the friend is available. If the friend is offline or otherwise unavailable, an indication may indicate the friend is unavailable. In some examples, user 20 is able to see indications of users who are not necessarily directly in a friend list of user 20. In other examples, an image or other indicator of a friend only shows up on the list if the friend is either available or online.

User 20 may toggle or select button 84 in order to indicate that user 20 is available or unavailable for a communication session. If user 20 was previously unavailable, user 20 may toggled button 84 to instruct client device 10 to indicate that user 20 is available for a communication session. Availability indicator 86 may then be displayed on output device 60. Availability indicator 86 may change to reflect the availability of user 20. In contrast, if user 20 was previously available and toggled button 84, availability indicator 86 would show that user 20 is unavailable. Toggling or selecting button 84 may cause communication client 12 to issue a signal indicating to other computing devices, such as client devices 40, that user 20 is available to participate in a communication session. The signal may be broadcasted to a relationship group of user 20.

User 20 may be using one or more applications 66 while communication module 14 operates an ambient communication session in the background of client device 10. When the communication session is ambient, user 20 may not actually be active in the communication session. In another example, user 20 may be the only participant in the ambient communication setting. That is, no other user may be in the communication session at that time. In some examples, responsive to a second user joining the communication session, the communication session is fully initialized and ceases to be an ambient communication session. In other examples, the communication session may be ambient only if user 20 is not currently participating in the communication session.

Creating an ambient communication session allows user 20 to indicate that she or he is available to communication session with contacts or other users. Communication module 14 provides functionality that allows user 20 to inform contacts or other users that he or she is truly available. Because user 20 may actively indicate that he or she is ready and available to communication session, it is more likely that user 20 is actually available when client device 10 indicates to client devices 40 that user 20 is available than by other means of determining availability. For example, some chat applications, executed by a computing device, may determine that a user is available to chat when the chat application detects a keystroke. However, although a keystroke may imply that the user is at the computing device, it does not necessarily mean the user is available for a chat. Therefore, providing user 20 with the ability to indicate when he or she is actually available for a communication session improves the likelihood that user 20 is actually available when availability indicator 86 indicates user 20 is available. Thus, user 20 may be in control of her or his presence.

Joining the communication session may cause the user who initiated the communication session to enter or join the user's own communication session. An ambient communication session may have multiple formats, which include small in-page to full in-page, one-way invitations and display and sound controls. An invitation to join a communication session may be provided to the initiator's contacts that are currently available. An invitation or feed may be updated based on who joins or leaves the communication session. Invitation may also be emailed or texted.

Figure 4:
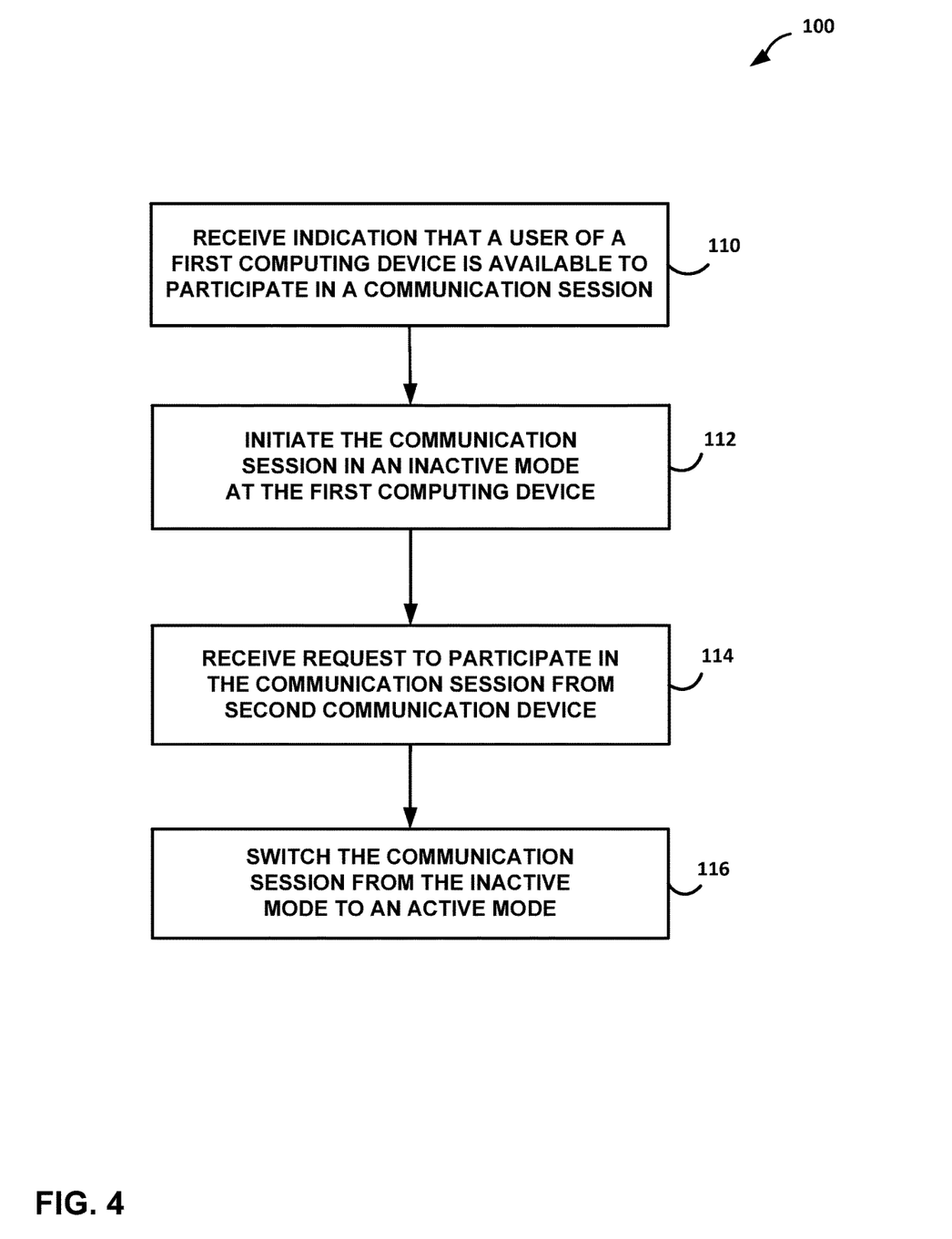
FIG. 4 is a flow chart illustrating an example method for creating an ambient communication session, in accordance with one or more aspects of the present disclosure.

FIG. 4 is a flow chart illustrating an example method 100 for creating an ambient communication session, in accordance with one or more aspects of the present disclosure. For purposes of illustration only, the method of FIG. 4 may be described with respect to client device 10 of FIGS. 1, 2, and 3. However, the example method 100 of FIG. 4 may be performed using other devices.

Method 100 may include receiving, at a first communication device, at least one signal indicating that a user is available to participate in a communication session that enables communication between different communication devices (110). The user may be a user of the first communication device. For example, user 20 may desire to indicate that he or she is available to engage in a communication session and provides client device 10 with user input signaling that user 20 is available for a communication session. The signal may be generated in response to user 20 providing client device 10 with user input that indicates user 20 is present and available to communication session. For example, user 20 may select a button, such as button 84, to indicate that she or he is available to participate in a communication session. Upon determining the button was selected, client device 10 may issue a signal indicating that user 20 is available for participation in a communication session. The signal may be broadcasted to a circle of contacts of user 20, informing the contacts that user 20 is available for a conversation (for example, user 20 wants to chat).

Method 100 may further responsive to receiving the at least one signal, initiating the communication session in an inactive mode at the first communication device (112). When the communication session is in an inactive mode, the communication session may not be fully enabled. For example, user 20 may not be participating in the communication session while it is inactive. User 20 may not be using client device 10 at all or may be using other features, such as those from one or more applications 66 of client device 10. In an inactive mode, an application associated with the communication session is at least one of minimized or operating in the background of client device 10.

An ambient communication session may not be in a full screen mode. In another example, an ambient communication session may be an in-page mole, which may be full-screen or less than full-screen. In a full screen mode, an output device 60, such as a display device, of client device 10 may display the communication session using part of or the entire graphical display area of the output device 60. For example, GUI 80 may display a communication session across part or all of the graphical area.

Initiation of a communication session may entail creating an ambient communication session, without fully launching all the features or aspects of a communications application used during a live communication session. In some examples, user 20 does not join the communication session when initiation begins. When user 20 has established an ambient communication session, the ambient communication session may be minimized in client device 10. While the communication session is in inactive mode (for example, ambient), an indication may be outputted by an output device, such as output device 60. An indication may inform user 20 that an ambient communication session is established and that her or his contacts have been notified that user 20 is available.

Client device 10 may send an indication to a server device or other client devices of other users that user 20 has begun an ambient communication session. In some examples, this may be performed along with starting initiation of the ambient communication session. The notification may be an invitation that is displayed via a feed in a social media application of the one or more other communication devices or users. The one or more other users may belong to a circle of contacts of user 20. The indication may notify the other users that user 20 is available for hanging out in a communication session. The indication may be provided on a live feed of a social network. Similarly, communication client 12 may receive notifications from one or more other users that the one or more other users are available for hanging out. Communication module 14 may provide an indication of other users' availability for participating in a communication session, for example, by displaying a message or indication on GUI 80.

While client device 10 has established an ambient communication session, method 100 may receive, at the first communication device, a request from a second communication device to participate in the communication session (114). The request to participate in the communication session is from a second user using a second communication device, wherein the second user makes the request. In some examples, the second user may have received an indication that user 20 is available for hanging out in a communication session before the second user requested to join the communication session of user 20. As used herein, joining a communication session may refer to initiating a new communication session or joining an already established communication session. An already established communication session may have one or more users participating in the communication session.

Responsive to receiving the request, the communication session may be switched at the first communication device from the inactive mode to an active mode (116). That is, the communication session has begun in the sense that participants may be interacting in the communication session. Switching the communication session to the active mode may include bringing an application associated with the communication session into a full-screen mode on the first communication device. Completing initiation of a communication session may include enabling more features than a subset of features that was available when the communication session was ambient. In some examples, completion occurs when another user besides user 20 has joined the communication session. Upon another user joining the communication session of user 20, the ambient communication session may cease to be ambient. That is, upon completing initiation of the communication session, communication session may be brought into an active mode on client device 10. For example, active mode may entail bringing an application associated with the communication session into a full-screen mode on client device 10. While the communication session is ambient, user 20 may or may not be in the communication session. However, in some examples, completing initiation of the communication session includes user 20 joining the communication session.

In other examples, when user 20 indicates he or she is available to communication session through a communication session, a communication session is not initiated. Instead, a notification may be sent to other users that user 20 is available. The other users may be selected because they are also available, they are associated with a particular context, they are within the circle of contacts of user 20, or by some other selection criteria.

In another example, responsive to receiving the at least one signal that the communication device is available to participate in a communication session, method 100 may provide a notification to at least one other communication device that the first communication device is available to participate in the communication session. In some examples, the notification may be provided only to other communication devices that are identified as currently available to participate in the communication session. The notification may be displayed in a live feed in a social media application associated with the other communication devices.

Method 100 may further include displaying a notification that the first communication device is available to participate in the communication session in a live feed of a social media application only when the first communication device is logged into the social media application.

In some examples, switching the communication session from active mode back to inactive mode may occur when only the first communication device is participating in the communication session. In such a case, the first communication device may receive at least one signal indicating that the first communication device is unavailable to participate in the communication session. Responsive to receiving the at least one signal indicating that the first communication device is unavailable, method 100 may further include ending the communication session.

In some examples, receiving at the first communication device, the at least one signal further comprises receiving, at an input device of the first communication device, user input indicating the user is available for the communication session. When the at least one signal is at least one first signal, initiating the communication session may further include providing, by the first communication device, at least one second signal to a host device connected to the first communication device, wherein the at least one second signal indicates the first communication device is available to participate in the communication session. The method may further include creating, by the host device, the communication session.

In another example, method 100 includes providing a touch target on a touch-sensitive display device of the first communication device, wherein toggling the touch target changes a status of the communication device between available and unavailable.

Figure 5:
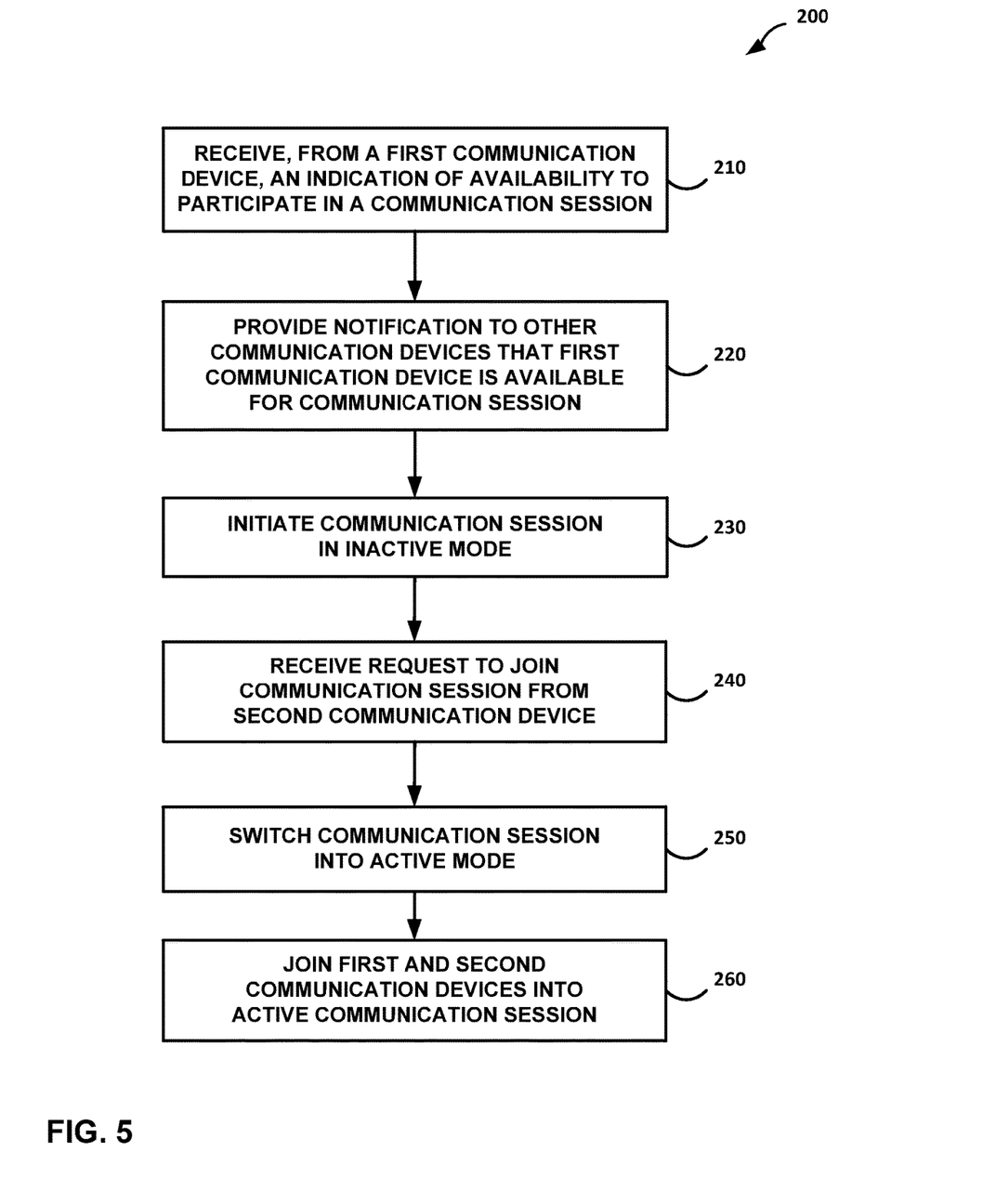
FIG. 5 is a flow chart illustrating another example method for creating an ambient communication session, in accordance with one or more aspects of the present disclosure.

FIG. 5 is a flow chart illustrating another example method 200 for creating an ambient communication session, in accordance with one or more aspects of the present disclosure. For purposes of illustration only, method 200 of FIG. 5 may be described with respect to server device 30 of FIG. 1. However, the example method 100 of FIG. 4 may be performed using other devices.

Method 200 may include receiving, from a first communication device, at least one signal indicating that a user of the first communication device is available to participate in a communication session, wherein the communication session enables communication between different communication devices (210). Responsive to receiving the at least one signal, method 200 may further include providing a notification to one or more other communication devices associated with the first communication device, wherein the notification indicates that the first computing device is available to participate in the communication session (220).

Method 200 may further include initiating the communication session in an inactive mode, wherein no communication devices are participating the communication session while in the inactive mode (230). Method 200 may further include receiving, from a second communication device of the one or more other communication devices, a request to join the communication session (240). For example, server 30 receives a request to join communication session 34 from client device 40-1. Responsive to receiving the request, method 200 may switch the communication session into an active mode (250). The first communication device and the second communication device may be joined into the active communication session (260).

In another example, method 200 may include determining that the other communication devices are associated with the first communication device when identities associated with the other communication devices are included in one or more relationship groups of the first communication device. For example, server 30 may determine which client devices 40 are included in a relationship group of client device 10. Sever 30 may send a notification that user 20 is available for a communication session to those client devices 40 that are in a relationship group of client device 10.

In another example, method 200 may include receiving, from the first computing device, at least one signal authorizing the second computing device to participate in the communication session. Joining the first communication device and the second communication device into the active communication session may be based on receiving the at least one signal authorizing the second computing device to participate in the communication session. In other examples, responsive to switching the communication session into the active mode, method 200 may include signaling the first communication device to bring an application executing the communication session on the first communication device into a full-screen mode.

Aspects of the present disclosure may improve social interaction because users may indicate when they are actually available to engage in a communication session. In addition, the richness of the communicated reactions, e.g., video or audio representations of user expressions, may further improve the social interaction because such representations may convey more information with less user effort.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

The invention claimed is:

1. A computer-implemented method, comprising:
receiving, at a first communication device, at least one signal indicating that a user is available to participate in a communication session via a communication application that enables communication between different communication devices;
initiating, at the first communication device, the communication session in an inactive mode of operation in response to receiving the at least one signal, wherein the inactive mode comprises executing the communication application in a background of the first communication device;
executing, at the first communication device, another application in a foreground of the first communication device while the communication session is in the inactive mode;

receiving, at the first communication device, a request from a second communication device to participate in the communication session; and switching, at the first communication device, the communication session from the inactive mode of operation to an active mode of operation in response to receiving the request, wherein the first and second communication devices are joined to the communication session in the active mode.

2. The computer-implemented method of claim 1, wherein the switching the communication session from the inactive mode of operation to the active mode of operation comprises executing the communication application in the foreground of the first communication device.

3. The computer-implemented method of claim 1, wherein the at least one signal is a user input to the first communication device that actively indicates that the user is available for the communication session.

4. The computer-implemented method of claim 1, further comprising:

receiving, at the first communication device, at least one authorization signal from the user authorizing the second communication device to participate in the communication session, wherein the switching the communication session from the inactive mode of operation to the active mode of operation is further in response to receiving the at least one authorization signal.

5. The computer-implemented method of claim 1, further comprising:

providing, from the first communication device, a notification to at least one other communication device indicating that the first communication device is available to participate in the communication session.

6. The computer-implemented method of claim 5, wherein the notification is provided in a live feed in a social media application associated with the at least one other communication device.

7. The computer-implemented method of claim 1, wherein initiating the communication session in the inactive mode of operation comprises launching the communication application in the background of the first communication device while the other application is executing in the foreground of the first communication device.

8. A first computing device, comprising:

one or more processors; and a non-transitory computer-readable storage medium having a plurality of instructions stored thereon, which, when executed by the one or more processors, cause the one or more processors to perform operations comprising:

receiving at least one signal indicating that a user is available to participate in a communication session via a communication application that enables communication between different computing devices;

initiating the communication session in an inactive mode of operation in response to receiving the at least one signal, wherein the inactive mode comprises executing the communication application in a background of the first computing device;

executing another application in a foreground of the first computing device while the communication session is in the inactive mode;

receiving a request from a second computing device to participate in the communication session; and switching the communication session from the inactive mode of operation to an active mode of operation in response to receiving the request, wherein the first and second computing devices are joined to the communication session in the active mode.

9. The first computing device of claim 8, wherein the switching the communication session from the inactive mode of operation to the active mode of operation comprises executing the communication application in the foreground of the first computing device.

10. The first computing device of claim 8, wherein the at least one signal is a user input to the first computing device that actively indicates that the user is available for the communication session.

11. The first computing device of claim 8, wherein the operations further comprise:

receiving at least one authorization signal from the user authorizing the second computing device to participate in the communication session, wherein the switching the communication session from the inactive mode of operation to the active mode of operation is further in response to receiving the at least one authorization signal.

12. The first computing device of claim 8, wherein the operations further comprise:

providing a notification to at least one other computing device indicating that the first computing device is available to participate in the communication session.

13. The first computing device of claim 12, wherein the notification is provided in a live feed in a social media application associated with the at least one other computing device.

14. The first computing device of claim 8, wherein initiating the communication session in the inactive mode of operation comprises launching the communication application in the background of the first computing device while the other application is executing in the foreground of the first computing device.

15. A non-transitory computer-readable storage medium having a plurality of instructions stored thereon, which, when executed by a first computing device, cause the first computing device to perform operations comprising:

receiving at least one signal indicating that a user is available to participate in a communication session via a communication application that enables communication between different computing devices;

initiating the communication session in an inactive mode of operation in response to receiving the at least one signal, wherein the inactive mode comprises executing the communication application in a background of the first computing device;

executing another application in a foreground of the first computing device while the communication session is in the inactive mode;

receiving a request from a second computing device to participate in the communication session; and switching the communication session from the inactive mode of operation to an active mode of operation in response to receiving the request, wherein the first and second computing devices are joined to the communication session in the active mode.

16. The non-transitory computer-readable storage medium of claim 15, wherein the switching the communication session from the inactive mode of operation to the active mode of operation comprises executing the communication application in the foreground of the first computing device.

17. The non-transitory computer-readable storage medium of claim 15, wherein the at least one signal is a user input to the first computing device that actively indicates that the user is available for the communication session.

18. The non-transitory computer-readable storage medium of claim 15, wherein the operations further comprise:
  receiving at least one authorization signal from the user authorizing the second computing device to participate in the communication session,
  wherein the switching the communication session from the inactive mode of operation to the active mode of operation is further in response to receiving the at least one authorization signal.

19. The non-transitory computer-readable storage medium of claim 15, wherein the operations further comprise:
  providing a notification to at least one other computing device indicating that the first computing device is available to participate in the communication session.

20. The non-transitory computer-readable storage medium of claim 19, wherein the notification is provided in a live feed in a social media application associated with the at least one other computing device.

21. The non-transitory computer-readable storage medium of claim 15, wherein initiating the communication session in the inactive mode of operation comprises launching the communication application in the background of the first computing device while the other application is executing in the foreground of the first computing device.

* * * * *